United States Patent [19]

Morrison

[11] 4,382,543
[45] May 10, 1983

[54] ACOUSTIC CONTROL FOR ZONE HEAT CONTROL SYSTEM

[76] Inventor: Thomas R. Morrison, 137 Overlook St., Mount Vernon, N.Y. 10552

[21] Appl. No.: 275,331

[22] Filed: Jun. 19, 1981

[51] Int. Cl.³ ............................................. G05D 23/00
[52] U.S. Cl. ................................... 236/10; 165/11 R; 236/51; 367/82
[58] Field of Search ..................... 236/51, 10; 165/22, 165/11 R; 251/131; 340/321; 367/82

[56] References Cited

U.S. PATENT DOCUMENTS

| | | | |
|---|---|---|---|
| 2,406,859 | 9/1946 | Smith | 367/82 X |
| 3,202,208 | 8/1965 | Geiringer | 165/22 |
| 3,988,896 | 11/1976 | Matthews | 367/82 X |
| 4,073,341 | 2/1978 | Parker | 367/82 X |

*Primary Examiner*—William E. Wayner
*Attorney, Agent, or Firm*—Thomas R. Morrison

[57] ABSTRACT

Thermostatically controlled valves and acoustic transducers are energized by thermostats in individual zoned heated areas of a structure. The thermostatic valves or dampers permit heated fluid to convey heat to their respective zoned heated areas and the acoustic transducer couples an acoustic signal to a feed or return duct or line. The acoustic signal is transmitted on the duct or line to an acoustic receiver in the vicinity of the furnace which, upon receiving the acoustic signal transduces the acoustic signal to an electric signal which is effective to control a controller. In one embodiment of the invention, periodic listening pulses are employed in the operation of the furnace and/or circulator to avoid interference with the communication system due to noise of these components.

11 Claims, 1 Drawing Figure

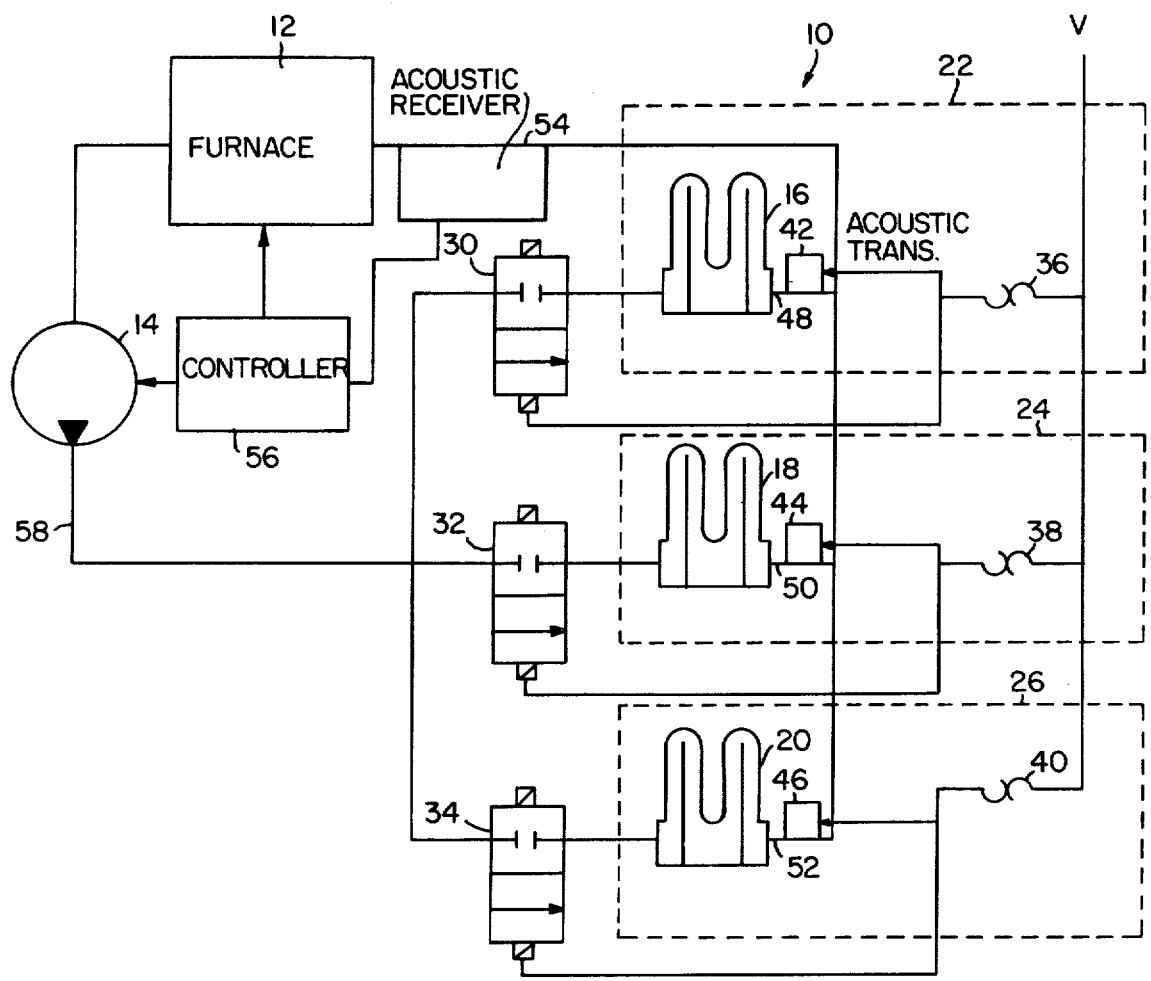

ACOUSTIC CONTROL FOR ZONE HEAT CONTROL SYSTEM

BACKGROUND OF THE INVENTION

The present invention relates to heating systems and, more particularly, to zone temperature control of heating systems.

In large structures, it is desirable to be able to separately control the temperature of different zones. For example, it may be desirable to separately control the temperature of daytime-use areas such as, for example, bedroom spaces. In addition, in a multiple family dwelling, it may be desirable to permit individual control of the heat in separate apartments.

Thermostatically controlled valves on individual heat radiating devices are known. It has been customary to employ individual thermostats in separate heating zones controlling valves feeding the heat radiating devices. When such thermostats are used, it has been necessary to run wires to the furnace controller to indicate to the furnace controller when heat is being called for by at least one thermostat. Such wiring represents a cost and installation problem in converting an existing heating system to zone heat control as well as adding to the trouble and expense of new construction.

OBJECTS AND SUMMARY OF THE INVENTION

Accordingly, it is an object of the present invention to provide a zone heat control system which permits individual control of heating zones without providing separate wiring from the heating zones to the furnace controller.

It is a further object of the invention to provide an acoustic communication system between individual heating zones and the furnace controller employing acoustic transmission of control signals on piping or conduits of the heating system itself from the individual heated zones to a transducer in the vicinity of the controller.

According to an aspect of the present invention, there is provided a heating control system for a structure of the type having at least one heated area with at least one heat delivering device in the at least one heated area, a furnace in a second area remote from the at least one heated area and means for communicating fluid between the furnace to the at least one heat delivering device, comprising means for controlling delivery of the heated fluid to the at least one heat delivering device in response to a temperature in the at least one heated area, means for imposing an acoustic signal on the means for communicating in response to the means for controlling whereby a demand for heat is indicated by the presence of the acoustic signal, and means in the second area for receiving the acoustic signal and means for controlling the furnace in response thereto.

The above, and objects, features and advantages of the present invention will become apparent from the following description read in conjunction with the accompanying drawings, in which like reference numerals designate the same elements.

BRIEF DESCRIPTION OF THE DRAWING

The FIGURE is a schematic diagram of a zone heat control system according to an embodiment of the present invention.

DETAILED DESCRIPTION OF THE PREFERRED EMBODIMENT

Referring now to the FIGURE, there is shown generally at 10, a zone heat control system according to an embodiment of the present invention. Although the present invention is applicable to all kinds of heating systems including hot air, hot water and steam, for concreteness of description, a hot water system is shown and described in detail. The differences between the hot water system in the figure and steam and hot air systems will be described later.

A hot water furnace 12 which may be of any convenient type such as, for example, electric, coal, oil or gas fired, is operative to heat a heating fluid, such as water passing therethrough. As is conventional, furnace 12 includes thermostatic controls (not shown) which turn on the burner thereof when temperature of the fluid therein or passing therethrough falls below a predetermined point and turns off the burner when the fluid temperature exceeds a predetermined point.

Fluid is pumped from furnace 12 by a fluid circulator 14 through a plurality of radiators 16, 18 and 20 located respectively in zoned heated areas 22, 24 and 26. Return water from radiators 16, 18 and 20 is returned on a return line 28 to furnace 12.

Thermostatically controlled valves 30, 32 and 34 are controlled by thermostats 36, 38 and 40, respectively, according to the temperatures in their respective zoned heated areas. Thermostatically controlled valves 30, 32 and 34 are illustrated as solenoid-controlled valves which are controllable by electrical thermostats 36, 38 and 40.

Thermostats 36, 38 and 40 are also connected respectively to acoustic transducers 42, 44 and 46 which mechanically and acoustically coupled to outflow lines 48, 50 and 52 from radiators 16, 18 and 20, respectively, which join return line 28.

An acoustic receiver 54 receives the acoustic signal transmitted along return line 28 or the water therein and applies an electrical signal to a controller 56 in response thereto. A control signal from controller 56 is applied to fluid circulator 14 and, optionally, controller 56 may also apply a control signal to furnace 12.

The word "acoustic" is used herein in its most general sense to mean pressure variations having any frequency or period which can be applied to, transmitted along and received from a heating conduit such as, for example, return line 28. An acoustic signal may consist of one or more pressure pulses or an audio frequency or hypersonic frequency.

In the apparatus shown in the figure, when one of thermostatically controlled valves, 30, 32 or 34 is energized to connect its respective radiator to fluid circulator 14, its related acoustic transducer 42, 44 or 46 is also energized.

An acoustic transducer such as, for example, acoustic transducer 42, produces a frequency when energized which it couples to outflow line 48. This frequency is preferably in the hypersonic range i.e. above about 20 Khz. In the preferred embodiment, acoustic transducer 42 produces short bursts of its frequency separated by relatively long pauses. For example, frequency bursts of about 100 miliseconds may be generated by acoustic transducer 42 and succeeding bursts may be separated by 5, 10, 30 or more seconds. The characteristic frequency of acoustic transducer 42 is transmitted on return line 28 and is received in acoustic receiver 54 which thereupon is effective through controller 56 to energize circulator 14.

Similarly, acoustic transducers 44 and 46 are responsive to their respective thermostats 38 and 40 to generate characteristic frequencies. Although it is possible for all acoustic transducers 42, 44 and 46 to produce approximately the same frequency, in the preferred embodiment, each of acoustic transducers 42, 44 and 46 produces a burst of a different frequency so that acoustic receiver 54 may discern that one, two or three thermostats are calling for heat and thus may apply through controller 56 a signal to fluid circulator 14 to vary the pumping rate of fluid circulator 14 according to the total demand for heat. For example, while acoustic transducer 42 generates bursts at 20 Khz, acoustic transducer 44 may generate bursts at 22 Khz and acoustic transducer 46 may generate bursts at 44 Khz. Due to the relatively low duty ratio of the bursts (the ratio of time on to time off) and the fact that acoustic transducers 42, 44 and 46 operate asynchronously, there is no necessity for relating the acoustic bursts from acoustic transducers 42, 44 and 46. That is, the probability of bursts from two acoustic transducers overlapping is very small and, if it should accidentally occur, since the bursts from acoustic transducers 42, 44 and 46 are asynchronous, and their periods may be deliberately made different, any overlap which does occur will endure for only one or two bursts.

In some systems, furnace and circulator noise may obscure the acoustic signals. This problem can be overcome by periodically halting the operation of fluid circulator 14 and furnace 12 for a short listening period and then resuming operation of these elements if a heat command acoustic signal is detected by acoustic receiver 54 or, maintaing circulator 14 and furnace 12 in the shut-off condition if no heat demand acoustic signal is received. For example, fluid circulator 14 and/or furnace 12 may be automatically turned off each 5, 10 or so minutes of continuous operation for a period long enough to ensure detection of all acoustic signals by acoustic receiver 54. If the acoustic bursts from acoustic transducers 42, 44 and 46 occur at, for example, 10 second intervals, a 30-second pause for verification of heat demand may be generated by controller 56 and the decision for continuation of circulator 14 and furnace 12 may be made on the basis of whether or not acoustic signals are received during that period.

Instead of installing acoustic transducers 42, 44 and 46 on outflow lines 48, 50 and 52, it would be clear to one skilled in the art that corresponding results could be achieved by installing these devices on the inflow lines to thermostatically controlled valves 30, 32 and 34. In this instance, the acoustic signals would be transmitted on feedline 58 and acoustic receiver 54 would preferably be moved into contact with feedline 58.

This arrangement may be advantageous since acoustic transducers 42, 44 and 46 may each be fabricated as a unit with its respective thermostatically controlled valve 30, 32 and 34 for simplified installation and electrical connection to thermostat 36.

In a hot air system, one skilled in the art would recognize that fluid circulator 14 is replaced by a blower and that thermostatic valves 30, 32 and 34 are replaced by thermostatically controlled dampers. Since these items are conventional and do not form a part of the present invention, detailed description thereof is omitted. Return line 28 will, of course, be recognized as a cold air return. Acoustic transducers 42, 44 and 46 are preferably loudspeaker-type devices effective to couple an acoustic signal to the air in either return duct 28 or feed duct 58. The remaining description of the invention and its operation given in preceding paragraphs applies equally to such a hot air system.

When the system is applied to a two-pipe steam system, a schematic of such a system is identical to that in the FIGURE except that a fluid circulator is not normally required. Also, return line 28 is probably the best transmission medium for the acoustic signals since this line is likely to be quieter than feedline 58 which is more likely to be subjected to the bubbling and boiling noises from furnace 12.

A single pipe gravity steam system is similar to the system in the FIGURE except that it is also absent a circulator and does not have a return line 28. That is, feedline 58 serves as both the feed and return lines in which water which has condensed from steam in radiator 16, 18 and 20 counterflows by gravity back into furnace 12. In this instance, there is no alternative but to apply acoustic transducers 42, 44 and 46 so that their acoustic signals travel on feedline 58 and are received in the vicinity of furnace 12 by acoustic receiver 54.

Acoustic transducers 42, 44 and 46 may include any suitable acoustic generator such as, for example, a 555 integrated circuit timer which feeds a selected frequency to a vibrating device such as, for example, a piezoelectric crystal in contact with its respective outflow line 48, 50 and 52. As is well known, external components added to 555 timers are effective to control the acoustic frequency generated thereby and also to control the length of time during which the acoustic frequency is generated and the duty ratio of such generation.

In a large installation having many heating zones, i.e. 20, 50 or more, advantage can be taken of the fact that the present invention permits modulation of the heating system according to the number of zones demanding heat. As is well known, a furnace operates most efficiently when it operates continuously. In a system where furnace 12 is, in fact, 2, 3 or more separate furnaces each being arranged to contribute heat to the system, controller 56, instead of, or in addition to, modulating the working rate of fluid circulator 14 may also energize or cut in a variable number of subunits in furnace 12 according to the demand. That is, if furnace 12 includes three burners and the structure includes fifteen heating zones, when any number from 1 to 5 of the heating zones call for heat, only one of the three furnace subunits is actuated, whereas when between five and ten demand heat, two are actuated and when more than ten demand heat, all three provide heat in parallel to the heating zones.

Having described a specific preferred embodiment of the invention with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. A heating control system for a structure of the type having at least one heated area with at least one heat delivering device in said at least one heated area, a furnace in a second area remote from said at least one heated area and means for communicating fluid between said furnace to said at least one heat delivering device, comprising:
  means for controlling delivery of said heated fluid to said at least one heat delivering device in response to a temperature in said at least one heated area;
  means for imposing an acoustic signal on said means for communicating in response to said means for controlling whereby a demand for heat is indicated by the presence of said acoustic signal;
  means in said second area for receiving said acoustic signal and means for controlling said furnace in response thereto; and
  said means for controlling is effective to periodically deenergize at least one of said furnace and said means for communicating for a listening period and is further effective to re-energize the items deenergized only if said acoustic signal is present during said listening.

2. A heating control system according to claim 1, wherein said at least one heated area includes at least first and second heated areas, said at least one heat delivering device includes at least a first heat delivering device in said first heated area and a second heat delivering device in said second heated area, said means for controlling delivery includes at least a first means for controlling delivery of heated fluid to said first heat delivering device in response to a first temperature in said first heated area and a second means for controlling delivery of heated fluid to said second heat delivering device in response to a temperature in said second heated area, said means for imposing an acoustic signal includes at least a first means for imposing a first acoustic signal on said means for communicating in response to said first temperature and a second means for imposing a second acoustic signal on said means for communicating in response to said second temperature.

3. A heating control system according to claim 2, wherein said means for communicating fluid is responsive to said first and second acoustic signals to provide a larger amount of said fluid than it provides when only one of said first and second acoustic signals is present.

4. A heating control system according to claim 2, wherein said first and second acoustic signals have at least one differing characteristic.

5. A heating control system according to claim 4, wherein said differing characteristic is a frequency.

6. A heating control system according to claim 2, wherein said first and second acoustic signals include first and second burst acoustic signals respectively each having a duty ratio substantially less than 0.5.

7. A heating control system according to claim 6, wherein said first and second burst acoustic signals are asynchronous.

8. A heating control system according to claim 6, wherein said first burst acoustic signal has an acoustic frequency different from a frequency of said second burst acoustic signal.

9. A heating control system according to claim 1, wherein said furnace is a hot water furnace, said means for communicating includes a feed line and a return line, said heat delivering device is a hot water radiator, said means for controlling delivery is a thermostatically controlled valve in one of said feed line and said return line, said means for imposing an acoustic signal is a thermostatically controlled acoustic transducer acoustically coupled to one of said feed line and said return line and said means in said second area includes an acoustic receiver coupled to the same one of said feed line and said return line.

10. A heating control system according to claim 1, wherein said furnace is a hot air furnace, said means for communicating includes a hot air duct and a return duct, said heat delivering device is a hot air register, said means for controlling delivery is a thermostatically controlled damper, said means for imposing an acoustic signal includes a loudspeaker in one of said hot air duct and said return duct, said loudspeaker being effective to couple said acoustic signal to air in the duct.

11. A heating control system according to claim 1, wherein said furnace is a steam furnace, said heat delivering device is a steam radiator, said means for communicating includes at least one steam pipe between said furnace and said stem radiator, said means for controlling delivery is a thermostatically controlled valve in said steam pipe, said means for imposing an acoustic signal is a thermostatically controlled acoustic transducer acoustically coupled to said at least one steam pipe and said means in said second area includes an acoustic receiver coupled to said at least one steam pipe.

* * * * *